United States Patent

[11] 3,631,417

[72] Inventors Willis Edward Golder
Holliston;
John Pellegrino, Saugus, both of Mass.
[21] Appl. No. 877,805
[22] Filed Nov. 18, 1969
[45] Patented Dec. 28, 1971
[73] Assignee RCA Corporation

[54] CYLINDRICAL MAGNETIC MEMORY CONSTRUCTION
6 Claims, 5 Drawing Figs.

[52] U.S. Cl. .......... 340/174 MA, 340/174 LA
[51] Int. Cl. .......... G11c 11/06, G11c 5/04
[50] Field of Search .......... 340/174 R; 307/88 P

[56] References Cited

UNITED STATES PATENTS

| | | | |
|---|---|---|---|
| 3,447,144 | 5/1969 | Snyder .......... | 340/174 X |
| 3,520,052 | 7/1970 | Hoffmann .......... | 340/174 X |
| 3,131,382 | 4/1964 | Valenta .......... | 340/174 X |
| 2,998,840 | 9/1961 | Davis .......... | 307/88 P |

OTHER REFERENCES

MOSFET In Circuit Design, by Robert H. Crawford, McGraw-Hill Book Co., copyright 1967, pages 113- 118

Electronics, " Hardy Memories," July 22, 1968, pages 42, 44 & 46.

*Primary Examiner*—Stanley M. Urynowicz, Jr.
*Attorney*—H. Christoffersen

ABSTRACT: A magnetic core memory construction, and method of construction, is disclosed in which selection diodes and magnetic core memory arrays are mounted on an elongated flexible web. The web has printed conductors thereon having external connection terminals and internal connection terminals. The diodes and memory wires are connected to internal connection terminals. The flexible web assembly is rolled into a cylindrical shape and enclosed in a container having an end cap that includes a multiterminal connector for connections to the external connection terminals of the flexible web. The container is filled with an insulating liquid. Expansion and contraction of the liquid is accommodated by an internal bellows which is vented on one side to the atmosphere.

Patented Dec. 28, 1971

3,631,417

2 Sheets-Sheet 1

INVENTORS
WILLIS E. GOLDER &
JOHN PELLEGRINO
BY
Carl V. Olson
Attorney

INVENTORS
WILLIS E. GOLDER &
JOHN PELLEGRINO
BY
Carl V. Olson
Attorney

CYLINDRICAL MAGNETIC MEMORY CONSTRUCTION

BACKGROUND OF THE INVENTION

Computer magnetic memories are often used in applications where the equipment must operate reliably under severe conditions of vibration and climate. According to a known memory construction for such service, wire memory arrays are mounted on an elongated web which is then folded in accordion fashion to form a memory stack occupying the volume of a rectangular prism. It is an object of this present invention to provide a memory construction, and method of construction, which is superior to the prior art as regards ease of assembly, ease of testing and repair, and reliability under adverse environmental conditions.

SUMMARY OF THE INVENTION

According to the invention, a memory is constructed on an elongated flexible web which is rolled up in a multiturn spiral to occupy a compact cylindrical volume. The assembly is enclosed in a protective container having provisions for electrical connections from the flexible web to the exterior.

DESCRIPTION OF THE PREFERRED EMBODIMENTS

Figure 1:
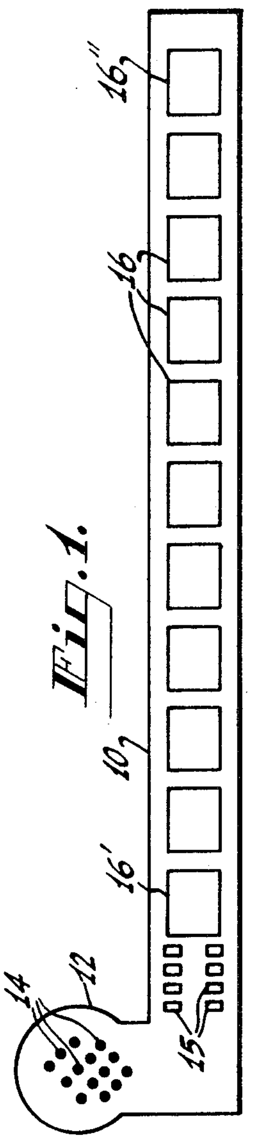
FIG. 1 is a plan view of an elongated flexible web on which are mounted selection diodes and magnetic core memory arrays.

Reference is now made to FIG. 1 which shows an elongated flexible insulating sheet or web 10 provided with an integral orthogonal extension 12 having external electrical connection terminals 14 thereon. The flexible web 10 has selection diodes 15, which may be integrated circuit units, mounted thereon near the extension 12. The flexible web 10 also has a plurality of magnetic core arrays 16 mounted thereon. Each memory core array 16 may include a number of magnetic cores equal to the number of words stored in the memory, and the number of memory arrays 16 may be equal to the number of information bits of each word stored in the memory. Each memory array 16 may, for example, include 64 rows and 64 columns of magnetic cores, and the number of memory arrays 16 may, for example, be 16.

Figure 2:
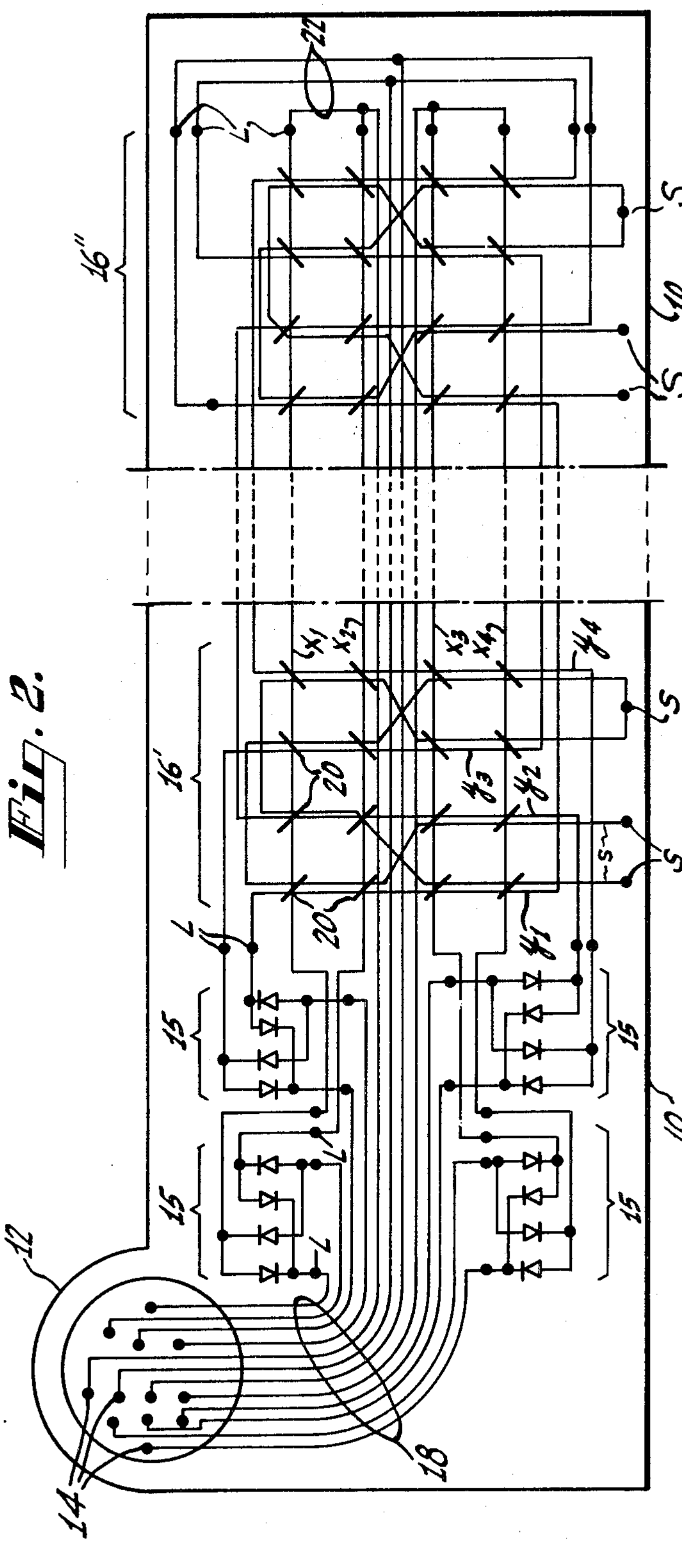
FIG. 2 is an enlarged view of a part of FIG. 1 showing the electrical connections of selection diodes and wires linking magnetic memory cores.

FIG. 2 is an enlargement of portions of FIG. 1 to show the selection diodes and magnetic memory cores and the conductors associated with the diodes and the cores. One magnetic core array 16' is illustrated as including only four rows and four columns of magnetic cores 20, for clarity of illustration. A terminal one 16'' of the memory arrays is also included in FIG. 2. Each memory array 16 is provided with manually strung *x*-selection row conductors $x_1$, $x_2$, $x_3$ and $x_4$. These *x* conductors are manually threaded as shown straight through all of the arrays 16 on the elongated flexible web 10. The *x*-selection wires have terminal ends soldered to printed circuit connection points or lands L on the flexible web 10.

Each of the four columns of cores in an array 16 is threaded by a respective *y*-selection conductor $y_1$, $y_2$, $y_3$ and $y_4$. The $y_1$ column conductor in array 16' is shown as extending to the right and up through the first column of cores in a following array 16''. The column conductor $y_1$ may consist of a single wire manually threaded up and down through the first columns of all of the arrays 16 on the flexible web 10. Each *y*-selection wire is soldered at its ends to printed circuit connection points or lands L on the flexible web 10.

Each array 16 is provided with an individual sense-inhibit winding *s* having two ends and a centertap soldered to respective connection points or lands S.

FIG. 2 also shows selection diode units 15, which may be integrated circuit units, mounted on the flexible web with connections soldered to printed circuit connection points or lands L. The described selection diode units 15 and memory arrays 16 are constructed and connected as a conventional, known coincident-current, three-dimensional, three-wire memory system.

The selection diode units 15, and the strung memory arrays 16 have been described as mounted on, and connected to, printed circuit connection points on the flexible web 10. The flexible web 10 also includes printed circuit conductors connecting the described connection points along paths 18 to external connection points or terminals 14. In addition, the web 10 includes printed circuit conductors at 22 which connect certain lands L to each other and to return paths leading to the external connection points 14. The connection points or lands L are designated internal connection points, to distinguish them from external connection points 14.

In the construction of the assembly shown in FIGS. 1 and 2, the arrays 16 of memory cores are initially mounted on, or adhered to, the flexible web 10. The cores are preferably mounted in position by means of a silicon rubber having a jellylike resilience. This is preferably accomplished in accordance with the method described in copending application Ser. No. 825,298, filed May 16, 1969, by Thomas P. Fulton, entitled "Magnetic Core Memory Plane Construction," and assigned to the assignee of this present application.

Wires are manually threaded through the mounted magnetic cores in a manner to provide a sufficient slack in the wires where they pass between memory arrays, so that the wires will not be tensioned when the assembly is later rolled up into a cylindrical form. The method described in the aforementioned patent application, in which the cores are resiliently yet firmly held in place, is very advantageous in practicing the present invention because the elongated assembly shown in FIGS. 1 and 2 may be handled and rolled into cylindrical form without disturbing the electrical and mechanical qualities of the assembly.

Figure 3:
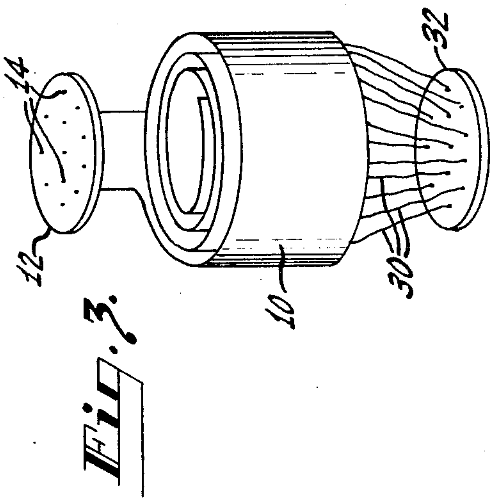
FIG. 3 is a perspective view of the flexible web of FIGS. 1 and 2 after being rolled up to occupy a cylindrical volume.
Figure 4:
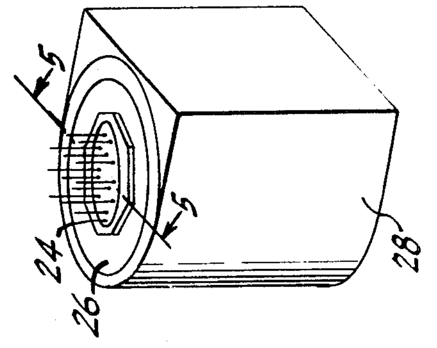
FIG. 4 is a perspective view of the exterior of a container for the assembly shown in FIG. 3.

FIG. 3 shows the rolled appearance of the elongated assembly of FIGS. 1 and 2. The elongated flexible web is rolled up in a multiturn spiral to occupy a compact cylindrical volume. The orthogonal terminal extension 12 of the flexible web 10 is shown as bent over to occupy a plane at right angles to the axis of the cylindrical configuration. The external connection points 14 on the extension 12 are individually connected to respective contacts of a multiterminal connector 24 shown in FIG. 4. The connector 24 is mounted in an end cap 26 of a protective enclosure 28.

The connection points or lands S shown in FIG. 2 are connected by wires 30 to a sense-inhibit connection member 32 (FIG. 3). The connection points on the member 32 are connected to a multiterminal connector 36 at the bottom of the container 28 (not shown in FIG. 4, but shown in FIG. 5).

Figure 5:
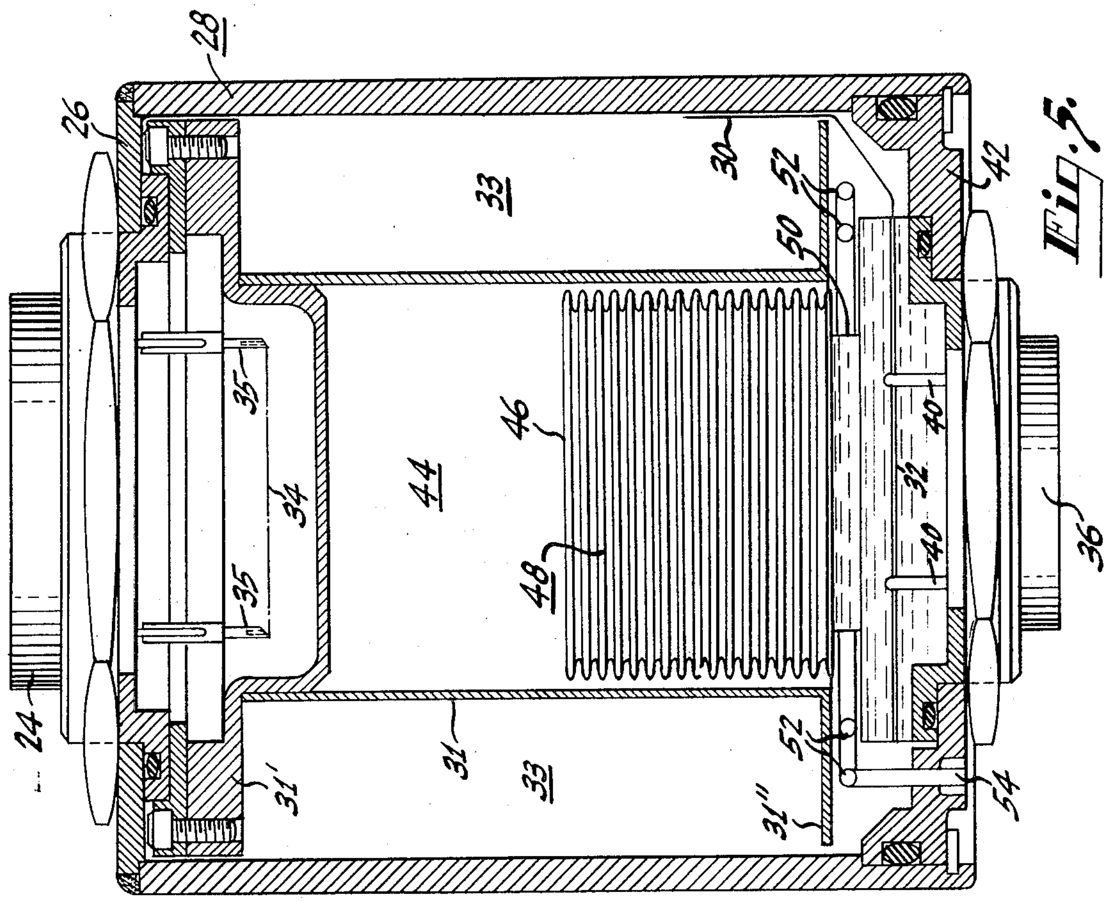
FIG. 5 is a sectional view taken on the line 5—5 of the container in FIG. 4.

Reference is now made to the cross-sectional view of FIG. 5 for a description of the construction of the protective enclosure 28, and its provisions for making electrical connections from the interior of the container to the exterior thereof. The interior of the container 28 includes a spool 31 having flanges 31' and 31''. The elongated flexible web shown in FIG. 3 is rolled up on the spool 31 so that it occupies the space designated 33. The extension 12 of the flexible web, which contains the external connection points 14, is folded over as shown in FIG. 3 so that it occupies a plane designated 34 in FIG. 5. The spool 31 is provided with openings (not shown) to permit the described positioning of the external connection portion 12 on the flexible web. The exterior connection points 14 are connected to respective contact pins 35 of a multiterminal quick-disconnect connector 24. The connector 24 is mounted in an end cap 26 of the enclosure 28.

The external connection points or lands S shown in FIG. 2 are connected by wires 30 to a printed circuit terminal member 32 shown in FIGS. 3 and 5. The terminal contacts of member 32 are engaged with respective contact pins 40 of a second multiterminal electrical connector 36. The connector 36 is mounted in a bottom end cap 42 of the container 28. The connector 36 is employed for connecting the memory sense-inhibit windings *s* from the interior of container 28 to external sense amplifiers (not shown). The connector 24 at the top end of the container 28 is employed for connecting the driven elements in the memory to external X and Y memory drive circuits (not shown).

The space 44 in the center of the spool 31 is occupied in part by a flexible diaphragm or bellows 46. The interior 48 of the bellows is in communication at 50 with a coiled tube 52 which leads to the outside of the enclosure 28 at 54. Except for the volume 48 within the bellows 46, the entire interior of the enclosure 28 is filled with an electrically insulating liquid. The purpose of the bellows 46 is to adjust for changes in the volume of the insulating liquid due to thermal expansion and contraction under severe climatic extremes.

The finally assembled and sealed memory unit in the container 28 is capable of operating reliably despite severe environmental conditions of vibration and temperature extremes. More importantly, the described memory construction is one in which the various stages of assembly are easily, efficiently and economically accomplished. The construction is also particularly convenient for testing the memory at various appropriate stages in its assembly. Furthermore, the construction is adapted for partial disassembly at any stage in construction at which tests indicate the need for repair of defective connections or elements. This feature is particularly important because of the fact that the cost of testing and repairing prior art memories is a high proportion of the cost of manufacturing such memories.

What is claimed is:

1. A magnetic memory, comprising
   an elongated flexible insulating web having printed conductors thereon which terminate at external connection points and at internal connection points,
   a plurality of selection diodes connected to internal connection points,
   an array of magnetic cores having wires threaded therethrough, the ends of said wires being connected to internal connection points,
   said elongated web assembly being rolled up into a multiturn spiral occupying a cylindrical shape, and
   a container enclosing said cylindrical assembly and including a multiterminal connector having contacts connected to respective ones of said external connection points on said web.

2. The combination as defined in claim 1 wherein said container is hermetically sealed and filled with an electrically insulating liquid.

3. The combination as defined in claim 2 wherein said container includes a flexible diaphragm separating said insulating liquid from the external environment.

4. A magnetic memory comprising
   a flexible insulating web having printed conductors thereon which terminate at external connection points and at internal connection points, and
   an array of magnetic memory elements mounted on said web and having access conductors connected to said internal connection points, said web assembly being rolled up in a multiturn spiral occupying a cylindrical shape, said web being elongated and including an orthogonal extension containing said external connection points, said extension being folded into a plane perpendicular to the axis of said cylindrical shape.

5. The combination as defined in claim 4, and in addition, selection diodes connected to said internal connection points.

6. The combination as defined in claim 4, and in addition, a container enclosing said cylindrical assembly and including a multiterminal connector having contacts connected to respective ones of said external connection points.

* * * * *